US012780406B2

(12) United States Patent
Birkey

(10) Patent No.: US 12,780,406 B2
(45) Date of Patent: Nov. 3, 2026

(54) AIRCRAFT LANDING GEAR STRUTS WITH INTEGRAL SHIMMY DAMPER

(71) Applicant: Textron eAviation Inc., Wichita, KS (US)

(72) Inventor: Justin Matthew Birkey, Wichita, KS (US)

(73) Assignee: TEXTRON eAVIATION INC., Wichita, KS (US)

( * ) Notice: Subject to any disclaimer, the term of this patent is extended or adjusted under 35 U.S.C. 154(b) by 377 days.

(21) Appl. No.: 18/592,774

(22) Filed: Mar. 1, 2024

(65) Prior Publication Data

US 2025/0276788 A1 Sep. 4, 2025

(51) Int. Cl.

| | |
|---|---|
| ***B64C 25/50*** | (2006.01) |
| ***B64C 25/34*** | (2006.01) |
| ***F16F 9/14*** | (2006.01) |
| ***F16F 9/342*** | (2006.01) |

(52) U.S. Cl.

CPC ............ *B64C 25/505* (2013.01); *B64C 25/34* (2013.01); *F16F 9/145* (2013.01); *F16F 9/342* (2013.01)

(58) Field of Classification Search

CPC ....... B64C 25/505; B64C 25/34; B64C 25/50; F16F 9/081; F16F 9/062; F16F 9/065; F16F 9/08; F16F 9/088; F16F 9/14; F16F 9/145; F16F 9/342

See application file for complete search history.

(56) References Cited

U.S. PATENT DOCUMENTS

| | | | | |
|---|---|---|---|---|
| 2,211,484 A * | 8/1940 | Raymond | ............. B64C 25/505 | 244/104 FP |
| 2,393,110 A * | 1/1946 | Kops | ..................... B64C 25/505 | 244/100 R |
| 4,795,009 A * | 1/1989 | Tanahashi | ................. F16F 9/36 | 188/315 |
| 2009/0224100 A1 | 9/2009 | Luce | | |
| 2025/0276788 A1* | 9/2025 | Birkey | .................. B64C 25/505 | |

FOREIGN PATENT DOCUMENTS

| | | | | |
|---|---|---|---|---|
| AT | 356973 B * | 6/1980 | .............. F16F 9/145 | |
| EP | 3093238 A1 * | 11/2016 | ............. B64C 25/58 | |
| GB | 2482154 A * | 1/2012 | ............. B64C 25/50 | |

OTHER PUBLICATIONS

EP3093237-A1 (Year: 2016).*

* cited by examiner

*Primary Examiner* — Thomas J Williams

(74) *Attorney, Agent, or Firm* — NIXON & VANDERHYE P.C.

(57) ABSTRACT

The embodiments disclosed herein are broadly concerned with aircraft nose wheel strut assemblies that include an integral (i.e., internal) shimmy damper. In preferred embodiments, the strut assemblies will include a central cylinder defining an interior fluid-filled (e.g., oil-filled) cylinder chamber adapted to being connected to frame structure of an aircraft and a piston tube telescopically received within the central cylinder for relative coaxial and rotational movements therebetween. A piston tube is provided with at least one shimmy damper fin extending into the interior fluid-filled cylinder and/or piston chambers to thereby create a drag force upon interaction with fluid in the interior fluid-filled cylinder and/or piston chambers in response to rotational movements of the piston tube relative to the central cylinder thereby providing shimmy damping of the nose wheel assembly.

26 Claims, 7 Drawing Sheets

AIRCRAFT LANDING GEAR STRUTS WITH INTEGRAL SHIMMY DAMPER

FIELD

The embodiments disclosed herein relate generally to aircraft landing gear. In especially preferred forms, the embodiments disclosed herein relate to aircraft landing gear struts, especially the nose wheel landing gear strut assembly of tricycle gear aircraft, that is integrally provided with a shimmy damper.

BACKGROUND

Virtually all aircraft with tricycle landing gear are provided with a nose wheel that is capable of being steered so as to affect the directional movement of the aircraft during ground operations. For example, some aircraft will be provided with a linkage system between the nose wheel landing gear and the rudder pedals. The pilot can therefore directly steer the nose wheel by selectively pressing on an individual rudder pedal. Other tricycle landing gear aircraft, especially light aircraft such as electric Vertical Take-Off and Landing (eVTOL) aircraft, have a freely castering nose wheel landing gear assembly whereby differential braking applied by the pilot to the aircraft's main wheels associated with the main landing gear assemblies allows the aircraft to be steered as desired.

One problem with nose wheel landing gear, especially freely castering nose wheel landing gear, is that the nose wheel can experience rapid oscillations (colloquially termed a nose wheel "shimmy") during ground operations at certain speeds, e.g., during high speed taxi and aircraft take off rolls. If left unchecked, the nose wheel shimmy can become quite violent and could damage the nose gear assembly and/or create an unsafe operational event. In order to reduce or eliminate such nose wheel shimmy, it is conventional to employ some form of shimmy damper which damps the nose wheel oscillations and thereby allows the nose wheel to track more linearly in the desired direction.

While conventional shimmy dampers are adequate for their intended purpose, some improvements are still sought. For example, it would be highly desirable if a low cost, light weight shimmy damper could be integrally incorporated within the nose wheel strut assembly. It is therefore towards providing such solutions that the embodiments disclosed herein are directed.

SUMMARY

The embodiments disclosed herein are broadly concerned with aircraft nose wheel strut assemblies that include an integral (i.e., internal) shimmy damper. In preferred embodiments, the strut assemblies will include a central cylinder defining an interior fluid-filled (e.g., oil-filled) cylinder chamber adapted to being connected to frame structure of an aircraft and a piston tube telescopically received within the central cylinder for relative coaxial and rotational movements therebetween. A nose wheel assembly is operably connected to a lower end of the piston tube so as to be moveable coaxially and rotationally as a unit with the piston tube.

The piston tube will include at least one shimmy damper fin extending into the interior fluid-filled cylinder chamber and/or an interior fluid-filled (e.g., oil-filed) piston chamber of the piston tube. The at least one shimmy damper fin will thereby create a drag force upon interaction with fluid in the interior fluid-filled cylinder and/or piston chambers in response to rotational movements of the piston tube relative to the central cylinder thereby providing shimmy damping of the nose wheel assembly.

According to some embodiments, the piston tube will include an isolation piston positioned within the piston tube and an orifice plate attached to an upper end of the piston tube above the isolation piston so as to establish the interior fluid-filled piston chamber therebetween. The orifice plate will define an orifice which fluid-connects the interior fluid-filled cylinder and piston chambers. The orifice plate my therefore include the at least one shimmy damper fin extending from the orifice plate into the interior fluid-filled cylinder and/or piston chambers to thereby create a drag force upon interaction with fluid in the interior fluid-filled cylinder and/or piston chambers in response to rotational movements of the piston tube relative to the central cylinder thereby providing shimmy damping of the nose wheel assembly. Alternatively (or additionally), an inner cylindrical surface of the piston tube may include the at least one shimmy damper fin extending radially inwardly therefrom into the fluid-filled piston chamber to similarly create the drag force which thereby provides shimmy damping of the nose wheel assembly.

The shimmy damper fins may be diametrically opposed to one another. For example, the shimmy damper fins may extend radially outwardly from the orifice defined by the orifice plate and/or may extend radially inwardly from the inner cylindrical surface of the piston tube. Further, multiple pairs of shimmy damper fins may be provided which extend into the interior fluid-filled cylinder and/or piston chambers. According to some embodiments, the multiple pairs of shimmy damper fins may extend outwardly from the orifice plate into both the interior fluid-filled cylinder chamber and the fluid-filled piston chamber. If multiple pairs of shimmy damper fins are provided, then each may extend outwardly from the orifice plate into both the interior fluid-filled cylinder chamber and the fluid-filled piston chamber. The shimmy damper fins may be integrally formed as a one-piece structure with the orifice plate.

The central cylinder may include an upper cap which closes an upper end of the central cylinder. A tapered metering pin may thus be provided which coaxially extends downwardly from the upper cap of the central cylinder through the orifice defined by the orifice plate.

The nose wheel assembly may include a fork attached to a lower end of the piston tube. Further, the lower end of the piston tube may be provided with a fitting to connect with the fork of the nose wheel assembly. The nose wheel assembly may further include a nose wheel journally coupled to the fork and a nose tire mounted to the nose wheel.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 1 is an enlarged elevational view of the forward portion of a lightweight aircraft (e.g., an eVTOL aircraft)

which includes a freely castering nose gear assembly provided with an integral shimmy damper according to an embodiment thereof as disclosed herein;

DETAILED DESCRIPTION OF EMBODIMENTS

Figure 1:
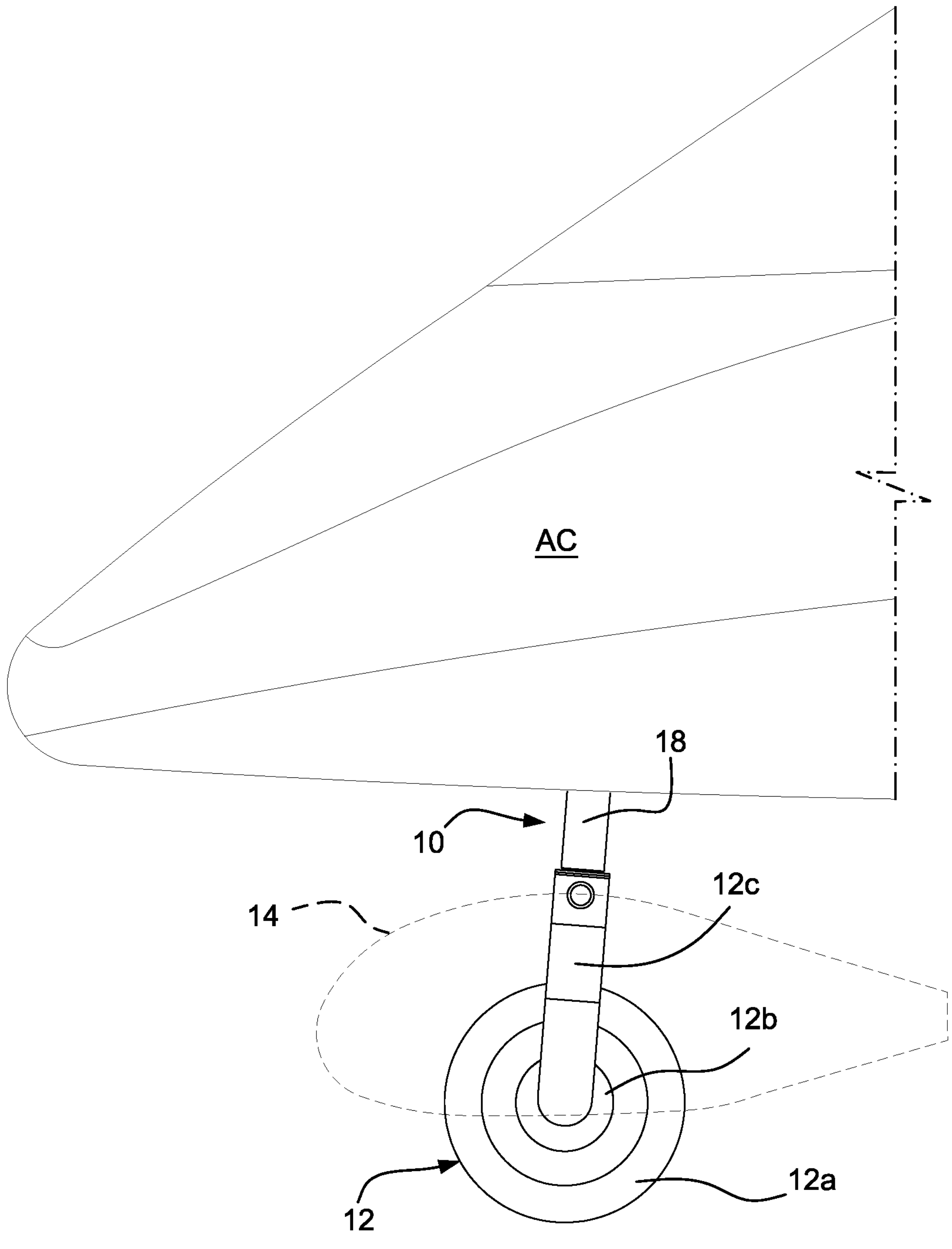

Accompanying FIG. 1 shows the forward portion of an exemplary aircraft AC (e.g., an eVTOL aircraft) which includes a freely castering nose wheel strut assembly 10 supporting a nose wheel assembly 12 having a nose tire 12*a* mounted to a nose wheel 12*b* that is journally coupled to a fork 12*c*. The strut 10 may also carry an aerodynamic fairing 14 (commonly called a "wheel pant") so as to reduce drag associated with the wheel assembly 12.

Figure 2:
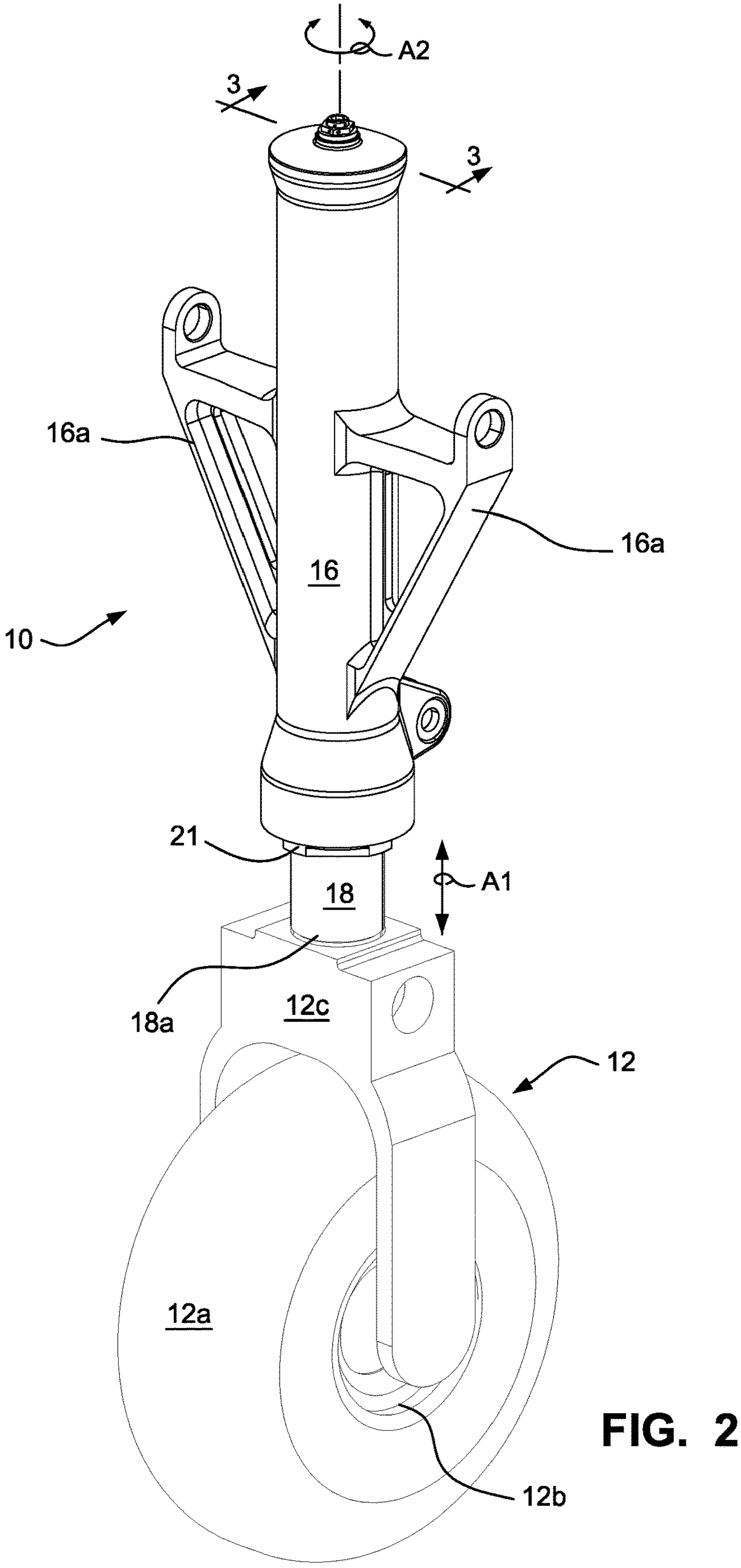
FIG. 2 is an enlarged view of the nose gear assembly employed in the aircraft shown in FIG. 1.
Figure 3:
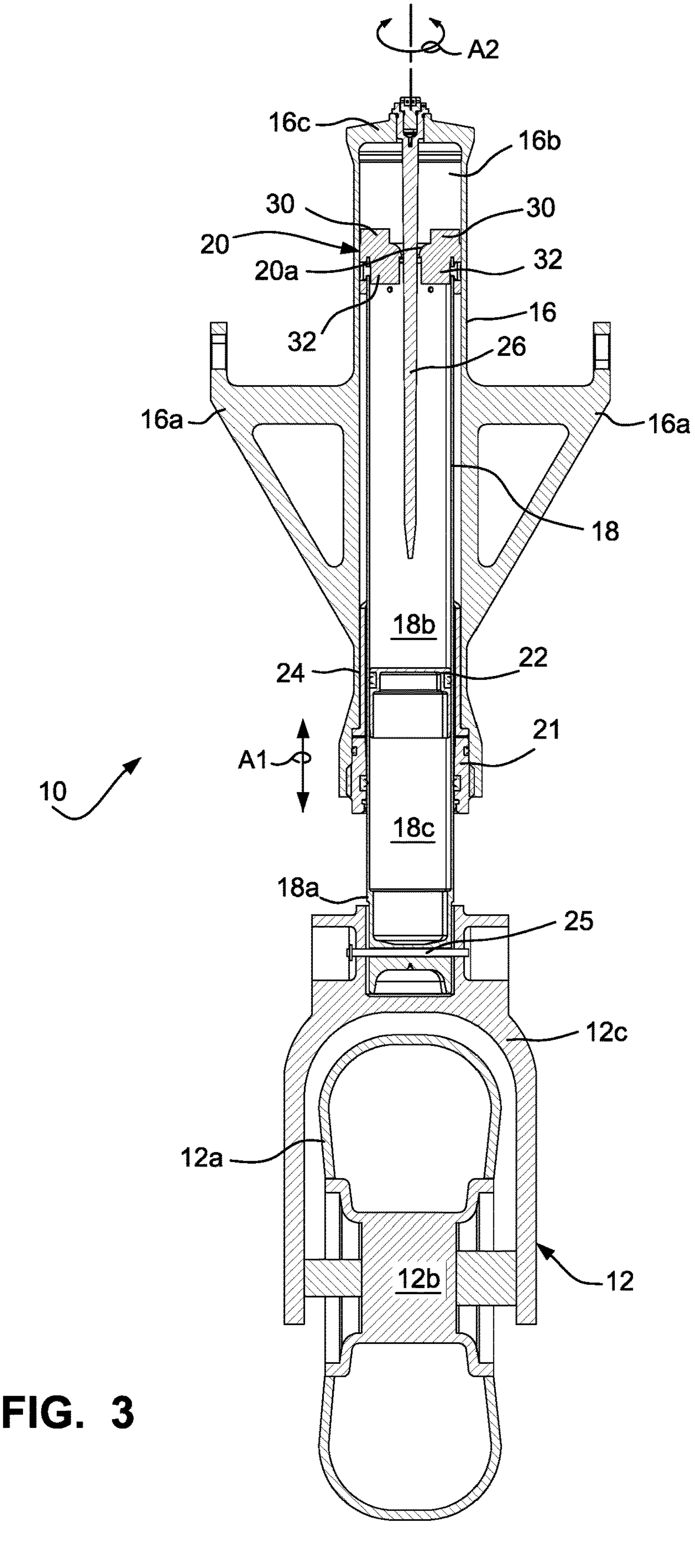
FIG. 3 is a cross-sectional elevational view taken along line 3-3 in FIG. 2.
Figure 4:
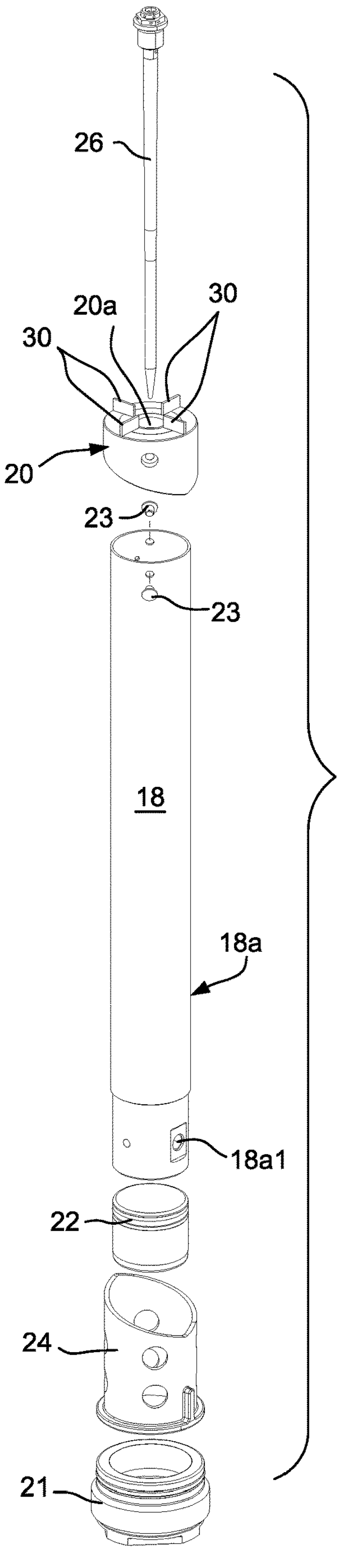
FIG. 4 is an exploded perspective view of the piston assembly employed in the nose gear assembly shown in FIGS. 2 and 3.

The nose wheel strut assembly 10 is shown in greater detail in accompanying FIGS. 2 and 3 as including a central cylinder 16 rigidly centered between a pair of trunnions 16*a* for connection to the aircraft frame structure (not shown). An elongate piston tube 18 is telescopically received within the central cylinder 16 and is secured therein by the lower packing sleeve 21 (see FIG. 3) which is slidably engaged with the piston tube 18 to allow for both axial movements (arrow A1) and free castering rotational movements (arrow A2) thereof within the central cylinder 16. An orifice plate 20 is fixed to an upper end of the piston tube 18 (e.g., via rivets 23 as shown in FIG. 4). The orifice plate 20 is thereby axially and rotatably moveable with the piston tube 18 in the directions of arrows A1 and A2, respectively.

The orifice plate 20 defines a coaxial orifice 20*a* that establishes fluid communication between the interior fluid-filled cylinder and piston chambers 16*b* and 18*b* of the central cylinder 16 and piston tube 18, respectively. An isolation piston 22 is internally positioned within the piston tube 18 in spaced relationship to the orifice plate 20 and thereby fluid-isolates the interior fluid-filled piston chamber 18*b* thereabove from a lower interior cylindrical piston chamber 18*c* therebelow. A fluid (e.g., oil) is thereby contained within the interior fluid-filled cylinder and piston chambers 16*b* and 18*b* of the cylinder 16 and piston tube 18, respectively, and is allowed to flow therebetween through the orifice 20*a* of the orifice plate 20. The lower end 18*a* of the piston tube 18 carries a fitting 24 that is positionally held by the lower packing sleeve 21. A bolt aperture 18*a*1 is provided in the lower end 18*a* of the piston tube 18 for attachment to the fork 12*c* of the nose wheel assembly 12, e.g., via bolt or pin 25. Thus, the nose wheel assembly is moveable in axial and rotatable directions (arrows A1 and A2, respectively) as a unit with the piston tube 18.

The upper end of the cylinder 16 is closed by an upper cap 16*c* that dependently carries a tapered metering pin 26 of sufficient length so as to coaxially extend through the orifice 20*a* of the orifice plate 20. It will be appreciated that as the piston tube 18 moves upwardly within the central cylinder 16 (e.g., as may occur when the weight of the aircraft AC is initially borne by the strut assembly 10 upon landing), the fluid within the interior cylinder chamber 16*b* thereof will be forced to flow through the orifice 20*a* and into the interior piston chamber 18*b* of the piston 18. At the same time, the annular area of the orifice 20*a* surrounding the metering pin 26 will progressively be restricted (e.g., due to the relative increasing diameter of the tapered geometry of the metering pin 26 as the orifice plate moves upwardly). Such annular area restriction to the flow of fluid from the interior cylinder chamber 16*b* to the interior piston chamber 18*b* through the orifice 20*a* will thereby provide a force absorption function. Conversely, once the force encountered by the strut assembly 10 has abated, the piston 18 is allowed to move axially downwardly relative to the central cylinder 16 which progressively increases the annular area of the orifice 20*a* surrounding the metering pin 26 which in turn thereby allows fluid to again return to the interior cylinder chamber 16*b* of the cylinder 16 from the interior piston chamber 18*b* of the piston 18.

Figure 5A:
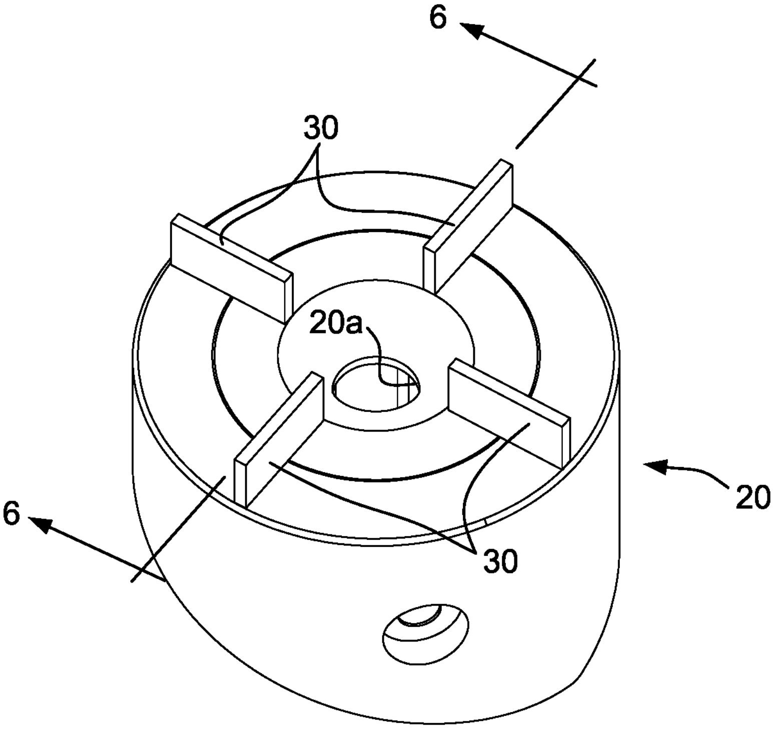
FIGS. 5A and 5B are enlarged top and bottom perspective views of the finned orifice plate of the piston assembly shown in FIG. 4.
Figure 5B:
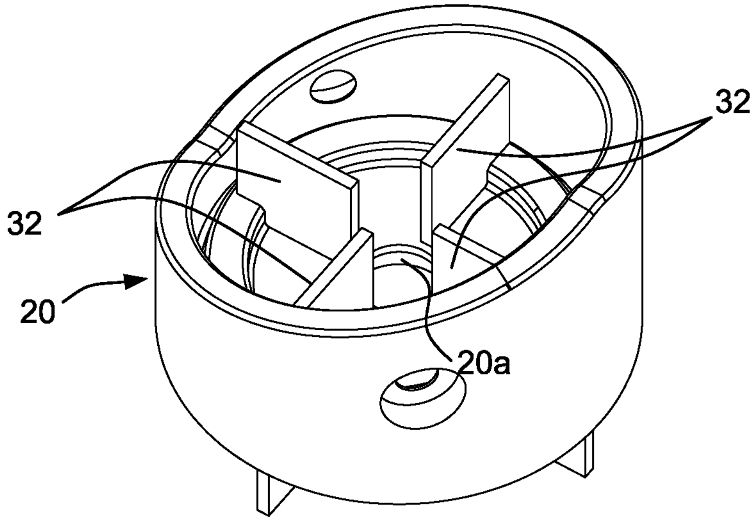
Figure 6:
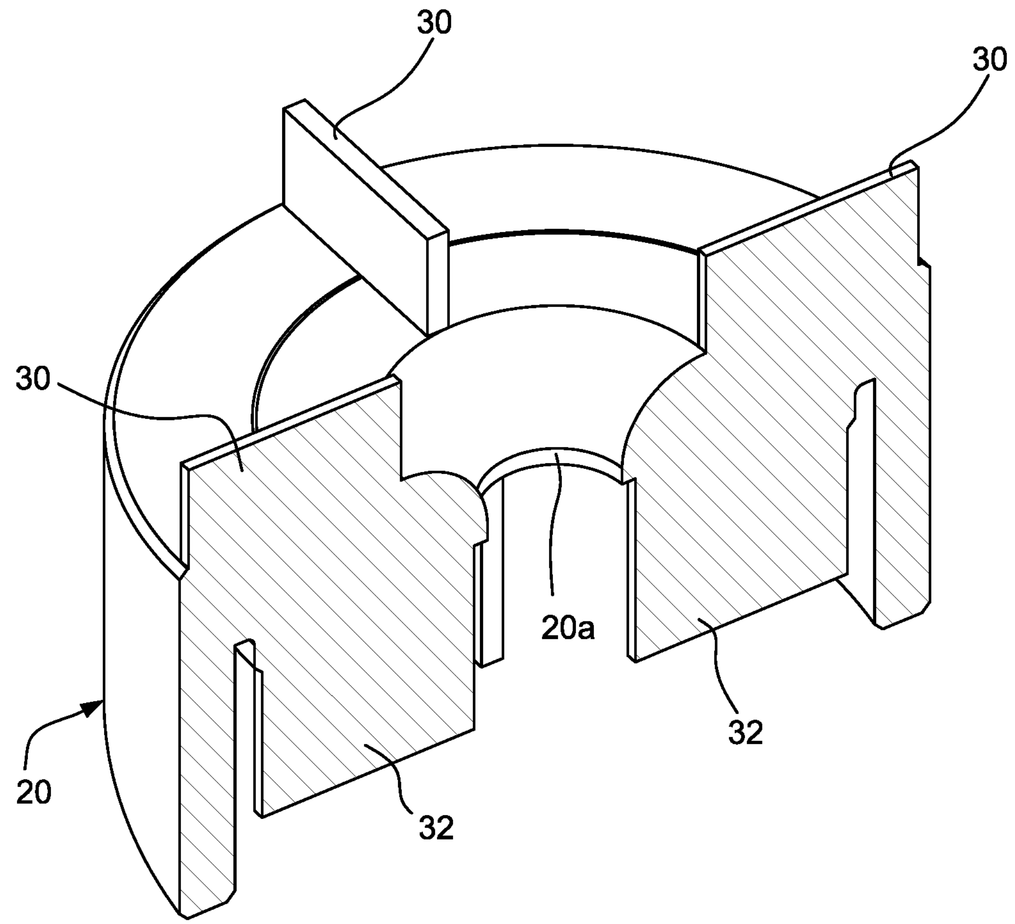
FIG. 6 is a cross-sectional perspective view of the finned orifice plate taken along lines 6-6 in FIG. 5A.

Important to the embodiments disclosed herein, the strut assembly 10 includes integral shimmy damping capabilities provided by at least one, and preferably a number of fins 30 and 32 extending upwardly and/or downwardly from the upper and/or lower surfaces of the orifice plate 20. As is depicted more clearly in FIGS. 5A-5B and FIG. 6, the fins 30 and 32 are planar structures which are most preferably arranged as diametrically opposed pairs radially extending from the orifice 20*a* and are integrally formed (e.g., as a one-piece structure) with the orifice plate 20. It will be appreciated that rapid rotational oscillations (shimmy) of the piston 18 within the cylinder 16 (arrow A2) will be dampened by virtue of the drag force which is created by the interaction of the fins 30, 32 with the fluid within the interior cylinder and piston chambers 16*b*, 18*b*, respectively. Such drag force will thereby minimize (if not eliminate entirely) nose wheel shimmy that may otherwise occur in the absence of such fins 30, 32.

Although diametrically opposed upper and lower pairs of fins 30, 32 are shown being provided which are circumferentially offset by about 90°, it will be appreciated that the offset can be less than 90° and/or that more or less than two pairs of such fins 30, 32 may be provided. Further, the fins 30, 32 are shown as being planar structures which extend upwardly and downwardly from the upper and lower surfaces, respectively, of the orifice plate 20 at right angles (90°). If desired, however, the fins 30, 32 could have a curvilinear cross-section or be oriented at an angle less than 90° relative to the upper and lower surfaces, respectively.

Figure 7:
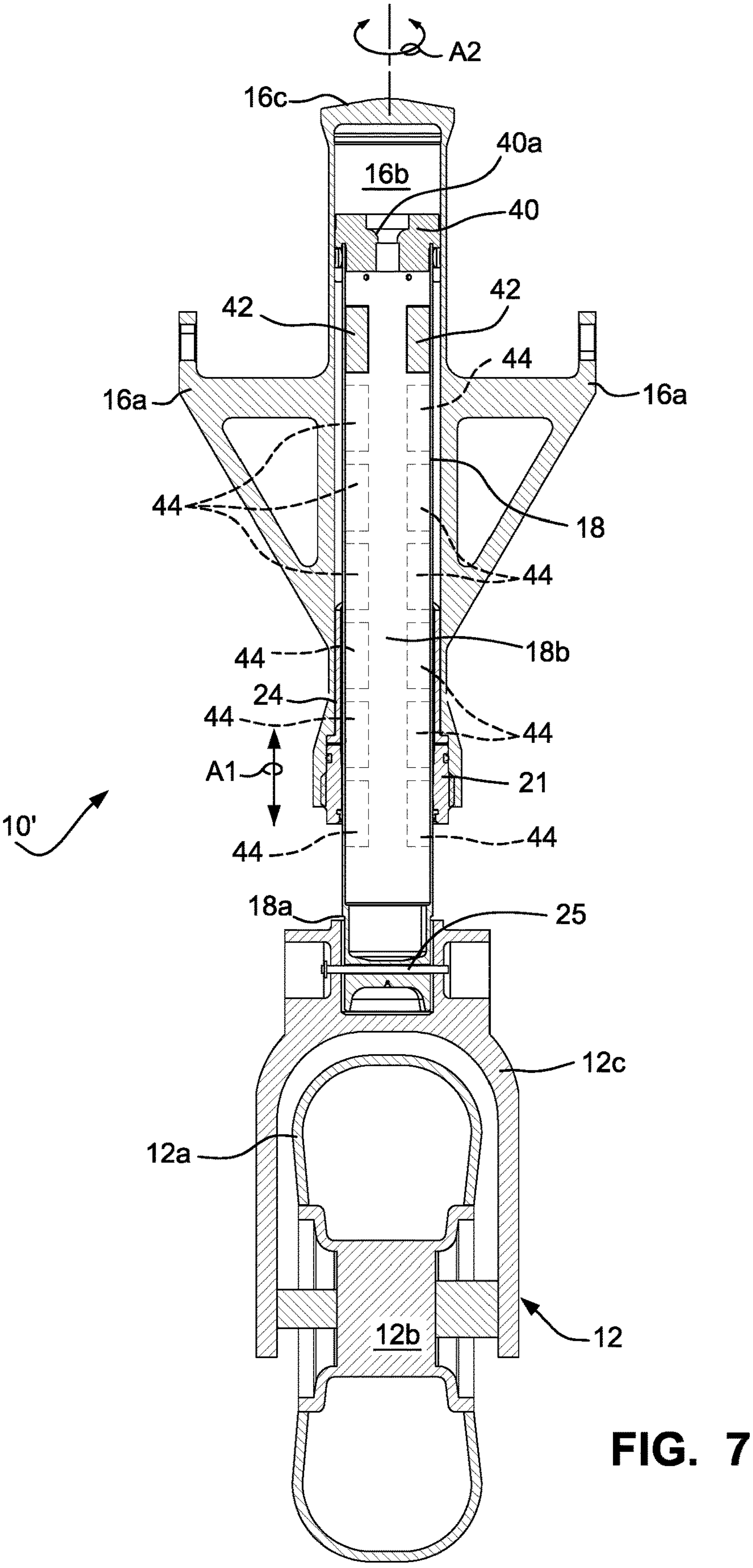
FIG. 7 is a cross-sectional elevational view similar to FIG. 3 of a freely castering nose gear assembly provided with an integral shimmy damper in accordance with another embodiment thereof as disclosed herein.

Another embodiment of a freely castering nose wheel assembly 10' is shown in FIG. 7. In this regard, those structural components in the embodiment of the nose wheel assembly 10' that are the same as those in the embodiment of the nose wheel assembly as previously described have been identified by the same reference numerals. One principal difference between the embodiment of the nose wheel assembly 10' shown in FIG. 7 and the nose wheel assembly 10 described previously is that the nose wheel assembly 10' includes an orifice plate 40 defining a orifice 40*a* which serves to allow fluid communication between the cylinder and piston chambers 16*b* and 18*b* but does not include a metering pin 26 depending from the cap 16*c* or an isolation piston 22 internally positioned within the piston tube 18. The nose wheel assembly 10' will also importantly have at least one pair of interior fins 42 extending radially inwardly from the inner cylindrical surface of the piston tube 18. As shown, the fins 42 may be positioned in diametrically opposed positions relative to one another. However, the fins may be angularly offset relative to one another if desired. Further, multiple additional pairs of interior fins 44 may be provided along the longitudinal direction of the piston tube 18 which similarly extend radially inwardly from the inner cylindrical surface thereof. Although the fins 42 and 44 are shown as being positioned in discrete pairs, it will be appreciated that the fins 42 could extend along the inner cylindrical surface of the piston tube 18 substantially the entirety of the longitudinal dimension thereof between the orifice plate 40 and the lower end 18*a*.

The fins 42 and/or 44 will serve to dampen shimmy oscillations of the piston tube 18 relative to the outer tube 16 by virtue of the drag force which is created by the interaction of the fins 42 and/or fins 44 with the fluid within the piston chamber 18*b*. Such drag force will thereby minimize (if not eliminate entirely) nose wheel shimmy that may otherwise occur in the absence of such fins 42 and/or 44.

While reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. An aircraft nose wheel strut assembly comprising:

a central cylinder defining an interior fluid-filled cylinder chamber and adapted to being connected to frame structure of an aircraft;

a piston tube defining an interior fluid-filled piston chamber, the piston tube being telescopically received within the central cylinder for relative coaxial and rotational movements therebetween, and a nose wheel assembly operably connected to a lower end of the piston tube so as to be moveable coaxially and rotationally as a unit with the piston tube, wherein, the piston tube includes multiple pairs of shimmy damper fins extending into the interior fluid-filled cylinder and/or piston chambers to thereby create a drag force upon interaction with fluid in the interior fluid-filled cylinder and/or piston chambers in response to rotational movements of the piston tube relative to the central cylinder thereby providing shimmy damping of the nose wheel assembly.

2. The aircraft nose wheel strut assembly according to claim 1, wherein the piston tube comprises (i) an isolation piston positioned within the piston tube and (ii) an orifice plate attached to an upper end of the piston tube above the isolation piston so as to establish the interior fluid-filled piston chamber therebetween, wherein the orifice plate defines an orifice which fluid-connects the interior fluid-filled cylinder and piston chambers, and wherein the multiple pairs of shimmy damper fins extend from the orifice plate into the interior fluid-filled cylinder and/or piston chambers to thereby create the drag force upon interaction with fluid in the interior fluid-filled cylinder and/or piston chambers in response to rotational movements of the piston tube relative to the central cylinder thereby providing shimmy damping of the nose wheel assembly.

3. The aircraft nose wheel strut assembly according to claim 2, wherein the orifice plate includes the multiple pairs of shimmy damper fins which are diametrically opposed to one another and extend radially outwardly from the orifice defined by the orifice plate.

4. The aircraft nose wheel strut assembly according to claim 2, wherein the multiple pairs of shimmy damper fins extend outwardly from upper and/or lower surfaces of the orifice plate into the interior fluid-filled cylinder and/or piston chambers, respectively.

5. The aircraft nose wheel strut assembly according to claim 4, wherein the multiple pairs of shimmy damper fins extend outwardly from upper and lower surfaces of the orifice plate into both the interior fluid-filled cylinder chamber and the fluid-filled piston chamber, respectively.

6. The aircraft nose wheel strut assembly according to claim 4, wherein each shimmy damper fin of the multiple pairs of shimmy damper fins is diametrically opposed to another shimmy damper fin of the multiple pairs of shimmy damper fins and extends radially outwardly from the orifice defined by the orifice plate.

7. The aircraft nose wheel strut assembly according to claim 2, wherein the multiple pairs of shimmy damper fins are integrally formed as a one-piece structure with the orifice plate.

8. The aircraft nose wheel strut according to claim 2, wherein the central cylinder includes an upper cap which closes an upper end of the central cylinder, and wherein the aircraft nose wheel strut further comprises a tapered metering pin coaxially extending downwardly from the upper cap of the central cylinder through the orifice defined by the orifice plate.

9. The aircraft nose wheel strut assembly according to claim 1, wherein the central cylinder includes an upper cap which closes an upper end of the central cylinder.

10. The aircraft nose wheel strut according to claim 1, wherein the multiple pairs of shimmy damper fins extend radially inwardly from the inner cylindrical surface of the piston tube.

11. The aircraft nose wheel strut assembly according to claim 10, wherein each of the multiple pairs of the shimmy damper fins are diametrically opposed to one another.

12. The aircraft nose wheel strut according to claim 1, wherein the nose wheel assembly comprises a fork attached to a lower end of the piston tube.

13. The aircraft nose wheel strut according to claim 12, wherein the lower end of the piston tube comprises a fitting, and wherein the fork of the nose wheel assembly is attached to the fitting.

14. The aircraft nose wheel strut according to claim 13, wherein the nose wheel assembly comprises a nose wheel journally coupled to the fork and a nose tire mounted to the nose wheel.

15. The aircraft nose wheel strut according to claim 1, wherein the central cylinder includes a trunnion for connecting the strut to the aircraft frame structure.

16. The aircraft nose wheel strut according to claim 1, wherein each of the fluid-filled cylinder and piston chambers is filled with an oil.

17. The aircraft nose wheel strut according to claim 16, wherein a lower end of the central cylinder includes a packing sleeve slidably engaged with the piston tube to allow for both axial and free castering movements of the piston tube relative to the central cylinder.

18. An aircraft which comprises the aircraft nose wheel strut according to claim 1.

19. An aircraft nose wheel strut assembly comprising:

a central cylinder defining an interior fluid-filled cylinder chamber and adapted to being connected to frame structure of an aircraft, the central cylinder including a cap which closes an upper end of the central cylinder;

a piston tube which comprises (i) an isolation piston positioned within the piston tube and (ii) an orifice plate attached to an upper end of the piston tube above the isolation piston so as to establish the interior fluid-filled piston chamber therebetween, wherein the orifice plate defines an orifice which fluid-connects the interior fluid-filled cylinder and piston chambers, the piston tube being telescopically received within the central cylinder for relative coaxial and rotational movements therebetween, a tapered metering pin coaxially extending downwardly from the cap of the central cylinder through the orifice defined by the orifice plate; and a nose wheel assembly operably connected to a lower end of the piston tube so as to be moveable coaxially and rotationally as a unit with the piston tube, wherein, the piston tube includes at least one shimmy damper fin extending from the orifice plate and into the interior fluid-filled cylinder and/or piston chambers to thereby create a drag force upon interaction with fluid in the interior fluid-filled cylinder and/or piston chambers in response to rotational movements of the piston tube relative to the central cylinder thereby providing shimmy damping of the nose wheel assembly.

20. The aircraft nose wheel strut assembly according to claim 19, wherein the piston tube includes at least one pair of shimmy damper fins.

21. The aircraft nose wheel strut assembly according to claim 19, wherein the piston tube comprises multiple pairs of shimmy damper fins.

22. The aircraft nose wheel strut assembly according to claim 19, wherein the orifice plate includes at least one pair of shimmy damper fins which is diametrically opposed to one another and extend radially outwardly from the orifice defined by the orifice plate.

23. The aircraft nose wheel strut assembly according to claim 22, comprising multiple pairs of shimmy damper fins extending outwardly from upper and/or lower surfaces of the orifice plate into the interior fluid-filled cylinder and/or piston chambers, respectively.

24. The aircraft nose wheel strut assembly according to claim 23, wherein the multiple pairs of shimmy damper fins extend outwardly from upper and lower surfaces of the orifice plate into both the interior fluid-filled cylinder chamber and the fluid-filled piston chamber, respectively.

25. The aircraft nose wheel strut assembly according to claim 23, wherein each shimmy damper fin of the multiple pairs of shimmy damper fins is diametrically opposed to another shimmy damper fin of the multiple pairs of shimmy damper fins and extends radially outwardly from the orifice defined by the orifice plate.

26. The aircraft nose wheel strut assembly according to claim 20, wherein the at least one pair shimmy damper fins is integrally formed as a one-piece structure with the orifice plate.

* * * * *